(12) United States Patent
Koivusaari et al.

(10) Patent No.: US 10,132,289 B2
(45) Date of Patent: Nov. 20, 2018

(54) SURFACE LEVEL FOLLOW-UP ARRANGEMENT FOR A WAVE ENERGY RE-COVERY SYSTEM

(71) Applicant: AW-ENERGY OY, Vantaa (FI)

(72) Inventors: Rauno Koivusaari, Koria (FI); Arvo Järvinen, Vantaa (FI)

(73) Assignee: AW-ENERGY OY, Vantaa (FI)

( * ) Notice: Subject to any disclaimer, the term of this patent is extended or adjusted under 35 U.S.C. 154(b) by 81 days.

(21) Appl. No.: 15/110,711

(22) PCT Filed: Jan. 8, 2014

(86) PCT No.: PCT/FI2014/050013
§ 371 (c)(1),
(2) Date: Jul. 8, 2016

(87) PCT Pub. No.: WO2015/104445
PCT Pub. Date: Jul. 16, 2015

(65) Prior Publication Data
US 2016/0327013 A1    Nov. 10, 2016

(51) Int. Cl.
*F03B 13/18*    (2006.01)
*F03B 13/26*    (2006.01)
*H02K 7/18*    (2006.01)

(52) U.S. Cl.
CPC .......... *F03B 13/187* (2013.01); *F03B 13/182* (2013.01); *F03B 13/264* (2013.01); *H02K 7/1876* (2013.01); *F05B 2270/20* (2013.01); *Y02E 10/28* (2013.01); *Y02E 10/38* (2013.01)

(58) Field of Classification Search
CPC .... F03B 13/182; F03B 13/187; F03B 13/262; F03B 13/14; B63G 8/22; H02K 7/1876
See application file for complete search history.

(56) References Cited

U.S. PATENT DOCUMENTS

| | | | | |
|---|---|---|---|---|
| 4,319,454 A | * | 3/1982 | Lucia | F03B 13/1815 417/332 |
| 5,084,630 A | * | 1/1992 | Azimi | F03B 13/182 290/42 |
| 6,768,217 B2 | * | 7/2004 | Chalmers | F03B 13/148 290/53 |

(Continued)

FOREIGN PATENT DOCUMENTS

WO    WO 2005/045136 A1    5/2005
WO    WO 2011/079199 A1    6/2011

(Continued)

*Primary Examiner* — Mark Laurenzi
*Assistant Examiner* — Shafiq Mian
(74) *Attorney, Agent, or Firm* — Birch, Stewart, Kolasch & Birch, LLP (57) ABSTRACT

This invention relates to a surface level follow-up arrangement for a wave energy recovery unit where the wave energy recovery unit comprises at least a panel element hinged at its lower edge onto the base at the bottom of the sea with the help of one or more support structures and one or more support shafts to make a reciprocating motion in response to kinetic energy of waves or tidal currents. The arrangement comprises at least a surface level follow-up means capable to change the vertical position of the upper edge of the reciprocating panel element along with the change of the vertical position of the surface level caused by a tidal fluctuation.

14 Claims, 7 Drawing Sheets

(56) References Cited

U.S. PATENT DOCUMENTS

| | | | | |
|---|---|---|---|---|
| 7,199,481 B2* | 4/2007 | Hirsch | F03B 13/1845 | |
| | | | 290/42 | |
| 7,411,311 B2* | 8/2008 | Tal-or | F03B 13/182 | |
| | | | 290/42 | |
| 9,541,054 B2* | 1/2017 | You | F03B 13/189 | |
| 9,624,899 B2* | 4/2017 | Foster | F03B 13/1885 | |
| 9,631,599 B2* | 4/2017 | Tuokkola | F03B 13/16 | |
| 9,739,257 B2* | 8/2017 | Bateman | F03B 13/182 | |
| 2006/0150626 A1* | 7/2006 | Koivusaari | F03B 13/182 | |
| | | | 60/499 | |
| 2013/0160444 A1* | 6/2013 | Foster | F03B 13/20 | |
| | | | 60/497 | |
| 2013/0269333 A1* | 10/2013 | Williams | F03B 13/182 | |
| | | | 60/506 | |
| 2017/0175700 A1* | 6/2017 | Pasanen | F03B 13/182 | |

FOREIGN PATENT DOCUMENTS

| | | |
|---|---|---|
| WO | WO 2012/022824 A1 | 2/2012 |
| WO | WO 2012/054152 A1 | 4/2012 |

\* cited by examiner

SURFACE LEVEL FOLLOW-UP ARRANGEMENT FOR A WAVE ENERGY RE-COVERY SYSTEM

The present invention relates to a surface level follow-up arrangement for a wave energy recovery system as defined in the preamble of claim 1.

The surface level follow-up arrangement according to the invention can be used for instance in connection with an apparatus having a plate like panel or wing hinged with its lower edge to make a reciprocating movement caused by wave energy or tidal energy of seawater. The wave energy or tidal energy collected by the apparatus is further converted with a wave energy converter system for instance to electric energy and/or fresh water, hydrogen, pressurized water, pressurized air or chemicals. For the sake of simplicity, only the term wave energy is later mentioned when both the wave energy and the tidal energy of seawater are meant.

According to the prior art there are various types of wave energy recovery systems where the arrangements include a base and one or more panels or wings of plate type pivotally connected to the base to make a reciprocating or oscillating movement about a rotation axis in response to wave forces or tidal forces. The oscillating movement is then converted for example to electric energy with the help of a generator or alike.

One significant problem in prior art wave energy recovery systems is the fluctuation of the surface level of the sea due to tidal currents. The fluctuation can be several meters, which causes power losses because during a high tide there is an area between the upper edge of the reciprocating panel and the surface level of the sea where a part of the wave energy passes the panel and therefore does not give all of its energy to the panel. Therefore, due to prevailing ocean conditions the efficiency of the known wave energy recovery systems have been generally very poor. It has been extremely difficult to adjust the known wave energy recovery systems to collect maximum wave energy in different tidal situations and also both during calm ocean conditions and during stormy ocean conditions. The known wave energy recovery systems have generally not handled well these kinds of extreme conditions and therefore the total efficiency has been so low.

One way to solve the problem mentioned above has been the adjustment of the height of the panel according to prevailing tidal conditions. However, this solution has its own problems. As mentioned above the height of the sea level varies often several meters between a low tide and a high tide, and in case the oscillating panel is hinged near the sea bottom it cannot be used optimally in all tidal situations. For example, if the panel reaches from the bottom to the surface during the low tide the upper edge of the panel remains far from the surface during the high tide and a huge portion of the wave energy that could have been collected immediately under the surface is lost. Correspondingly, if the panel reaches from the bottom to the surface during the high tide the upper edge of the panel extends high from the surface during the low tide and is therefore both visually undesirable and also loses its ability to collect the maximum amount of wave energy because of the wind that decreases the collecting power.

A known solution for the adjustment of the height of the reciprocating panel according to prevailing tidal conditions is shown in Japanese patent publication No. JPH04358769 (A), (Nakajima Kosan KK). The publication shows a water pump apparatus having a plate like wing that is hinged onto the bottom of the sea and arranged to reciprocate along with the waves. On the upper part of the wing there is a freely moving part with a float that keeps the upper edge of the moving part always on the surface of the water. When the tide level changes the float with the moving part moves up and down according to the tide level. Thus, when the tide level is high the float moves up and lengthens the height of the wing, and when the tide level is low the float moves down and shortens the height of the wing correspondingly. This solution like other similar floating solutions, where the float follows the sea level freely and considerably fast without damping, has a disadvantage that it follows not only a tide but also waves and therefore it is not suitable for stormy sea conditions, and adjustments or protective arrangements against stormy sea conditions are difficult and costly to make. Another disadvantage is that a continuous vibration caused by the free follow-up of the sea level and waves leads to an undefined follow-up of the surface level that causes much more motion and wear to the components of the panel and also make adjustments more difficult as mentioned earlier. The Japanese arrangement may work as a water pump but it does not work as an efficient wave energy recovery arrangement, for instance to convert wave energy to electric energy.

The object of the present invention is to eliminate the drawbacks described above and to achieve a reliable and efficient surface level follow-up arrangement for a wave energy recovery system in order to be able to capture a maximum amount of available wave or tidal energy also in all tidal phases. Likewise the object of the present invention is to achieve a surface level follow-up arrangement for a wave energy recovery system where the height and/or height position of the upper edge of the plate like panel or wing is easily and automatically adjustable, and where the motion of the follow-up arrangement is attenuated so that only the slow motion of the surface level caused by the tide is followed by the follow-up arrangement. The surface level follow-up arrangement for the wave energy recovery system according to the invention is characterized by what is presented in the characterization part of claim 1. Other embodiments of the invention are characterized by what is presented in the other claims.

The solution of the invention has the advantage that thanks to the advanced self-operated and automatic surface level follow-up arrangement the energy conversion can be maximized because the system is very adaptable to various ocean conditions. Thus the maximum power from the panel motion from the low tide to the high tide can be supplied to the power-take-of (PTO) means of the wave energy recovery system. Another advantage is the fact that the attenuated and smooth motion of the upper edge of the panel reduces vibrations that make the panel more durable, and because the surface area of the panel changes smoothly the continuous adjustability of the arrangement is easily controllable. That helps in maximizing the energy conversion, and makes it possible to protect the apparatus against stormy sea conditions.

In the following, the invention will be described in detail by the aid of examples by referring to the attached simplified and diagrammatic drawings, wherein.

Figure 1:
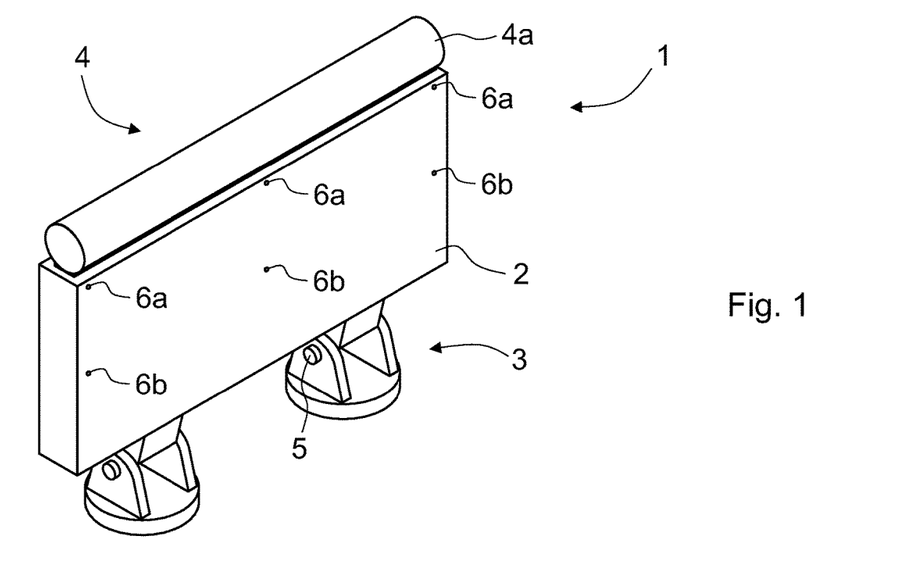
FIG. 1 presents in an oblique top view a reciprocating panel element of a wave energy recovery unit according to the invention in an upright position and a surface level follow-up means at the upper edge of the panel element in a lowermost position.
Figure 2:
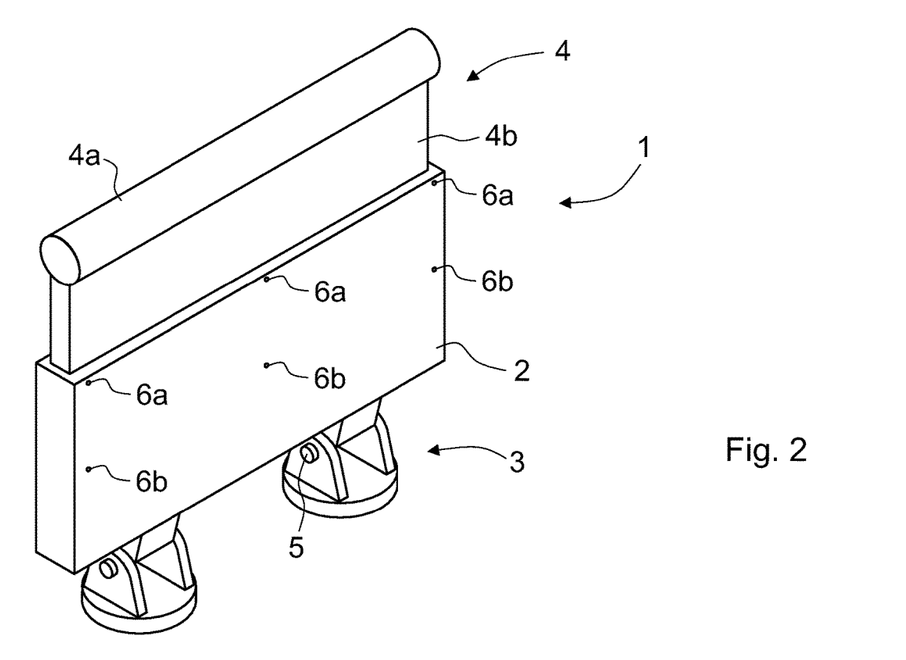
FIG. 2 presents in an oblique top view the panel element according to FIG. 1 in the situation where the surface level follow-up means at the upper edge of the panel element has been lifted upwards.
Figure 3:
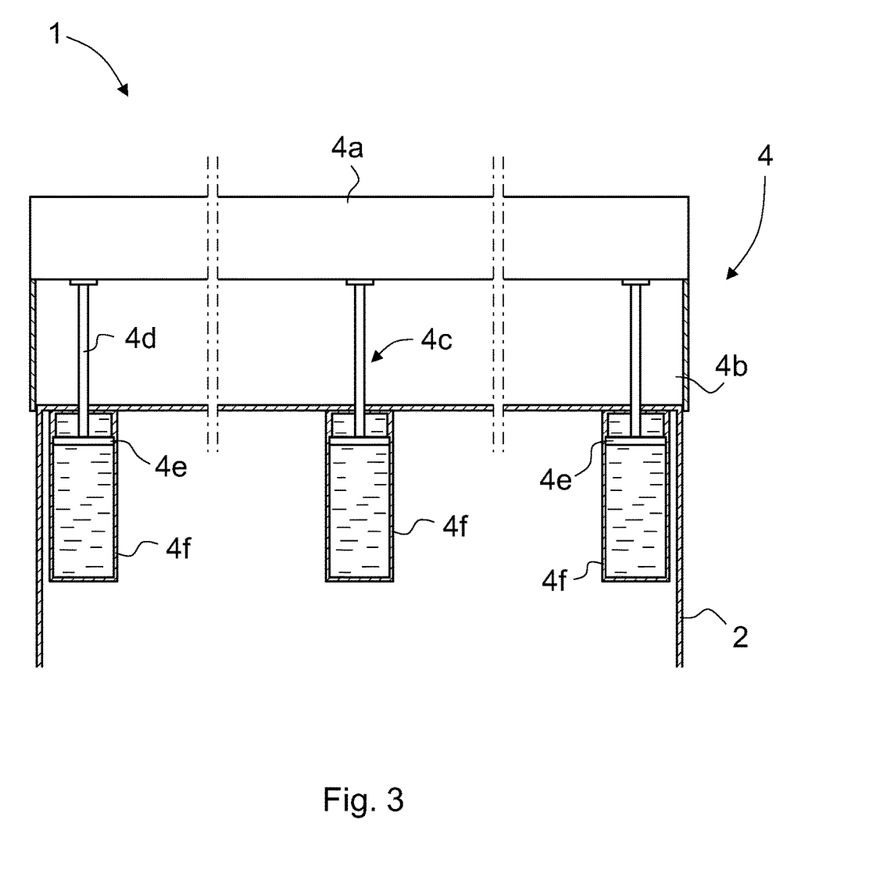
FIG. 3 presents in a front view, in a simplified and diagrammatic way and as a partial section an upper part of the panel element according to the invention in its uppermost position.

In FIGS. 1-3 a reciprocating panel element 2 of a wave energy recovery unit 1 according to the invention equipped with a surface level follow-up means or follower 4 is shown in an upright position. In FIG. 1 the surface level follow-up means 4 at the upper part of the panel element 2 is in its lowermost position, and in FIGS. 2 and 3 the surface level follow-up means 4 has been moved linearly upwards and at the same time outwards from the upper part of the lower portion of the panel element 2. The surface level follow-up means 4 forms the upper portion of the panel element 2. So, the surface level follow-up means 4 and the lower portion of the panel element 2 together form the entity that is later called in a shorter way as the panel element 2.

The wave energy recovery unit 1 according to the invention comprises at least the plate like panel element 2 that is hinged onto the base at the bottom of the sea with the help of one or more support structures 3 and one or more support shafts 5. Each wave energy recovery unit 1 comprises in addition at least recovering means or the power-take-of (PTO) means of the wave energy. The panel element 2 is arranged to make reciprocating motion caused by the kinetic energy of the waves, and the recovered energy is either saved into the energy storages situated inside the panel element 2 or transferred through the collecting means and cables or pipes to the use of the next unit that can be for instance a collecting station situated on shore. The fresh water produced by the wave energy recovery unit 1 can be stored in containers situated inside the panel element 2 of the wave energy recovery unit 1, and delivered time to time for further use. The lower portion of the panel element 2 can be hollow comprising one or more compartments that are sealed against seawater and which compartments contain the devices and means needed to collect, convert and store the wave energy.

In order to be able to optimize the capture of the wave energy during all different tidal and weather conditions the position of the upper edge of the reciprocating panel element 2, i.e. the upper edge of the surface level follow-up means 4, in relation to the prevailing surface level has to be controlled. This means that the distance between the upper edge of the reciprocating panel element 2 in its upright position and surface level of the sea should keep essentially the same all the time though the surface level varies according to tidal periods. The fluctuation can be several meters, which causes power losses because during a high tide there can be a high area between the upper edge of the reciprocating panel element 2 and the surface level of the sea where a massive part of the wave energy passes the panel element 2 without giving its energy to the panel element 2.

The controlling is performed with the surface level follow-up means 4 that is installed at the upper part of the lower portion of the panel element 2 as shown in FIGS. 1-3. The surface level follow-up means 4 shown in FIGS. 1 and 2 has a pontoon-like upper part 4a and a wall-like lower part 4b that is for example inside the lower portion of the panel element 2 when the surface level follow-up means 4 is at its lowermost position. Later in this description the upper part 4a will be called a pontoon 4a and the lower part 4b is called a panel extension 4b.

The panel extension 4b of the surface level follow-up means 4 could be outside the lower portion of the panel element 2 as shown in FIG. 3 where the foremost side walls of the panel extension 4b of the surface level follow-up means 4 and the lower portion of the panel element 2 have been removed. The panel extension 4b of the surface level follow-up means 4 forms advantageously a partial or continuous wall against the water flow but it can also be more or less open.

The pontoon 4a is hollow and filled with gas like air to the extent that makes the pontoon 4a to float in a pre-determined depth in the water when taking the whole free mass of the surface level follow-up means 4 into consideration. Thus the upper edge of the pontoon 4a can be at a certain distance below the surface level or the pontoon 4a can be floating partially or completely on the surface of the sea.

The pontoon 4a is about circular in its cross-section. Correspondingly the panel extension 4b is for example flat like a wall. The pontoon 4a is supported by a group of supporting members 4c, for instance by two or more supporting members 4c, each of which comprising for instance a piston rod 4d, a piston 4e and a cylinder 4f where the piston 4e moves back and forth. The cylinders 4f are fastened to the lower portion of the panel element 2, preferably inside the panel element 2, and the vertical position of the cylinders 4f can vary according to the structure of the arrangement. So, the vertical position of the cylinders 4f can be as up as possible like shown in FIG. 3 and in the most of the figures, or somewhere lower as shown for example in FIGS. 4 and 5.

An upper choke valve 6a is located in the upper part of the cylinder 4f above the piston 4e and a lower choke valve 6b is located in the lower part of the cylinder 4f beneath the piston 4e. The choke valves 6a and 6b can be simple apertures that operate automatically without any adjustment, or they can be for instance adjustable magnet control valves that can be adjusted and opened or closed for instance by a remote control. The choke valves 6a and 6b are connected for instance from inside the cylinder 4f to the seawater outside the panel element 2 so that depending on the pressure seawater can flow freely into the cylinder 4f and out from the cylinder 4f moving at the same time the piston 4e to one direction at a time. The diameter of the aperture of the choke valves 6a and 6b is selected so that the pontoon 4a follows automatically the height variation of the surface level of the sea at the same rate of speed as the tide varies. So, when the tidal period from the lowermost level to the uppermost level is about 6 hours, the upper part 4a follows the surface with the same about 6 hours' period. Thus the distance between the upper edge of the pontoon 4a and the surface level of the sea keeps always essentially the same, and disturbing vibration caused by motions of waves does not exist.

Figure 4:
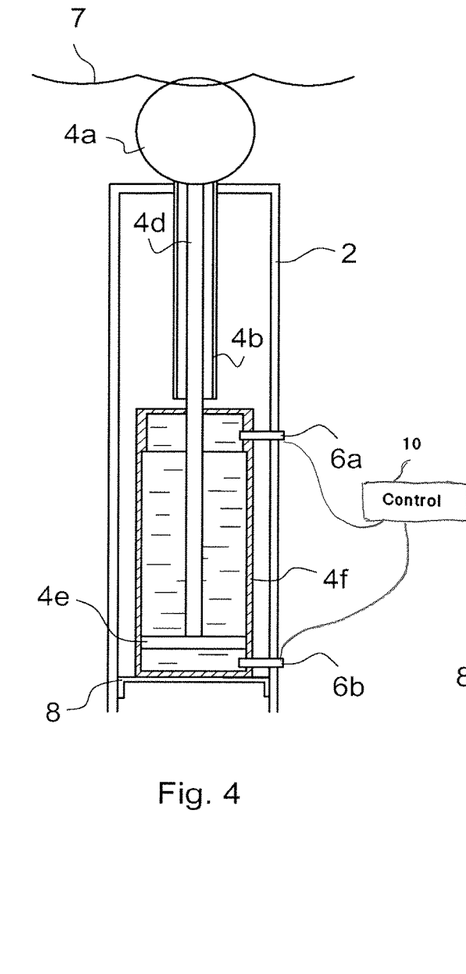
FIG. 4 presents in a side view, in a simplified and diagrammatic way and as a partial section an upper part of the panel element according to one embodiment of the invention in its lowermost position.
Figure 5:
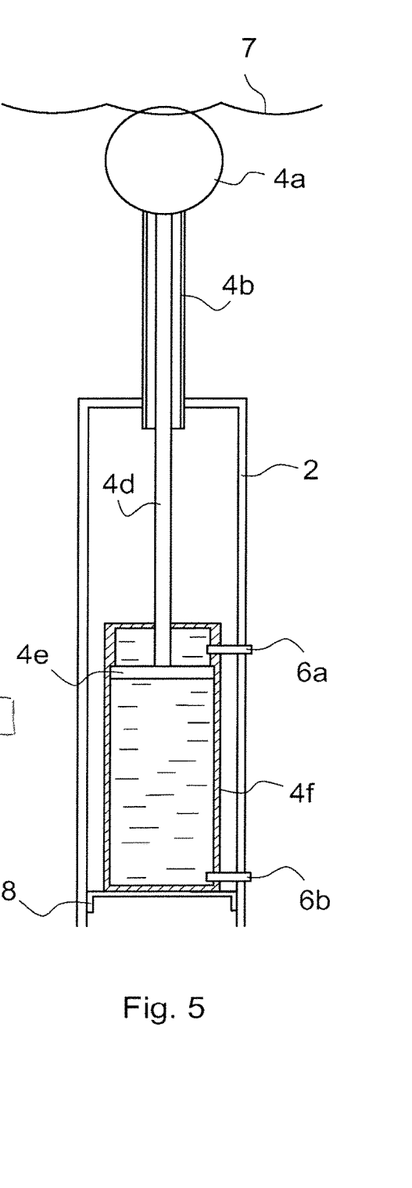
FIG. 5 presents in a side view, in a simplified and diagrammatic way and as a partial section an upper part of the panel element according to FIG. 4 in its uppermost position.

FIGS. 4 and 5 present in a side view and in a simplified and diagrammatic way an upper section of the panel element 2 according to one embodiment of the invention. In FIG. 4 the pontoon 4a of the surface level follow-up means 4 is in its lowermost position when the tide is low, and in FIG. 5 the pontoon 4a of the surface level follow-up means 4 is in its uppermost position when the tide is high. In this embodiment the buoyancy balance of the surface level follow-up means 4 has been adjusted so that the amount of air inside the hollow space of the pontoon 4a is sufficient to keep the upper edge of the pontoon 4a just about the surface level 7. The structure of the upper section of the wave energy recovery unit 1 is shown as a partial section so that the inner parts of the panel extension 4b and the panel element 2 are visible. The pontoon 4a is shown unsectioned.

When the tide is low the piston 4e is in its lowermost position in the cylinder 4f that is full of liquid that is in this example seawater. When the tide comes in and the surface level 7 begins to rise the buoyancy of the pontoon 4a draws the pontoon 4a, panel extension 4b, piston rod 4d and the piston 4e upwards along with the slowly rising surface level 7. When the piston 4e is rising upwards it draws at the same time seawater through the lower choke valve 6b into the lower part of the cylinder 4f. At the same time the same amount of water escapes from the upper part of the cylinder 4f through the upper choke valve 6a to the sea. The choke valves 6a and 6b limit the speed of the motion of the piston 4e so that the moving parts 4a-4e connected to each other move attenuated along with the slowly rising surface level 7 and do not follow the faster wave motions.

The cylinder 4f is fastened to the inner walls of the panel element 2 with one or more brackets 8 or alike, and in this embodiment the cylinder 4f is positioned so low that the wall of the panel extension 4b can be unbroken and the panel extension 4b can move up and down inside the lower portion of the panel element 2 without colliding into the cylinder 4f. If the cylinders 4f were higher the walls of the panel extension 4b should be equipped with proper openings matching with the size and locations of the cylinders 4f.

Figure 6:
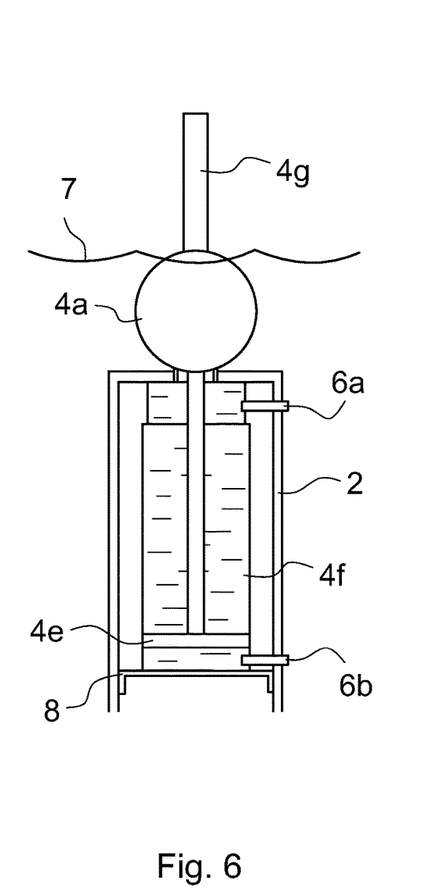
FIG. 6 presents in a side view, in a simplified and diagrammatic way and as a partial section an upper part of the panel element according to another embodiment of the invention in its lowermost position.
Figure 7:
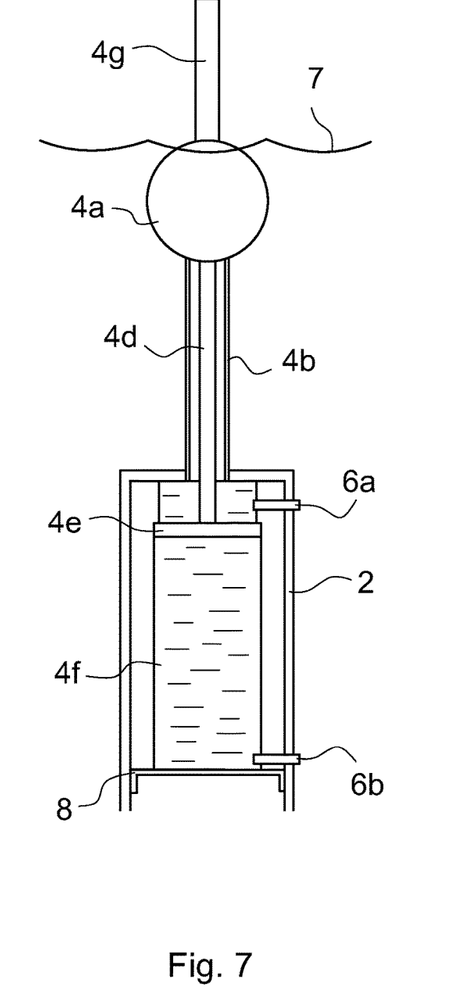
FIG. 7 presents in a side view, in a simplified and diagrammatic way and as a partial section an upper part of the panel element according to FIG. 6 in its uppermost position.

FIGS. 6 and 7 present basically the similar structure as FIGS. 4 and 5. Only an additional panel portion 4g above the pontoon 4a differs from the structure shown in FIGS. 4 and 5. Although it is usually better than all the reciprocating parts of the panel element 2 are beneath the water surface, in certain conditions it may improve the efficiency if the upper part of the panel element 2 is above the surface level 7. By using the additional panel portion 4g fastened on the upper surface of the pontoon 4a it is easy to adjust the total height of the reciprocating panel element 2. Because the cylinders 4f in this embodiment are positioned just to the upper edge of the lower portion of the panel element 2 the walls of the panel extension 4b cannot be unbroken and therefore the walls of the panel extension 4b are equipped with openings matching with the size and locations of the cylinders 4f so that the walls of the panel extension 4b cannot collide with the cylinders 4f.

Figure 8:
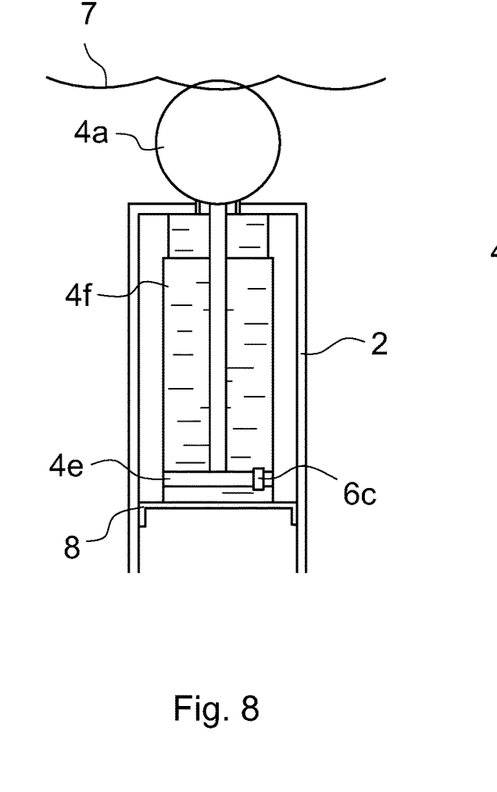
FIG. 8 presents in a side view, in a simplified and diagrammatic way and as a partial section an upper part of the panel element according to yet another embodiment of the invention in its lowermost position.
Figure 9:
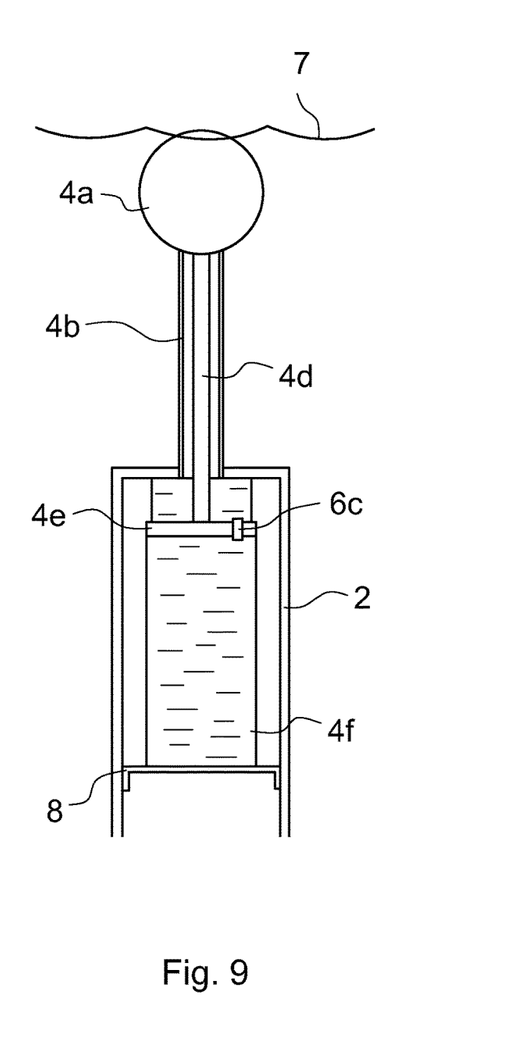
FIG. 9 presents in a side view, in a simplified and diagrammatic way and as a partial section an upper part of the panel element according to FIG. 8 in its uppermost position.

FIGS. 8 and 9 present otherwise the similar structure as FIGS. 4 and 5 but now the position of choke valves is different. Instead of having two separate choke valves 6a and 6b at different sides of the piston 4e the structure comprises now only one choke valve 6c that is installed on the piston 4e so that the choke valve 6c connects the lower part of the cylinder 4f to the upper part of the cylinder 4f through the piston 4e. The cylinder 4f is full of liquid, for instance hydraulic oil or water, and when the piston 4e moves upwards the liquid flows from the upper part of the cylinder 4f into the lower part of the cylinder 4f through the choke valve 6c at the speed limited by the aperture of the choke valve 6c, and when the piston 4e moves downwards the liquid flows from the lower part of the cylinder 4f into the upper part of the cylinder 4f through the choke valve 6c at the speed limited by the aperture of the choke valve 6c. So, the movement of the piston 4e and also all the parts 4a-4d connected to each other is attenuated by the choke valve 6c to follow slowly and without any additional vibrations to the fluctuation of the surface level 7 of the sea caused by the tidal fluctuation. In this embodiment the walls of the panel extension 4b are also equipped with openings matching with the size and locations of the cylinders 4f so that the walls of the panel extension 4b cannot collide with the cylinders 4f.

Figure 10:
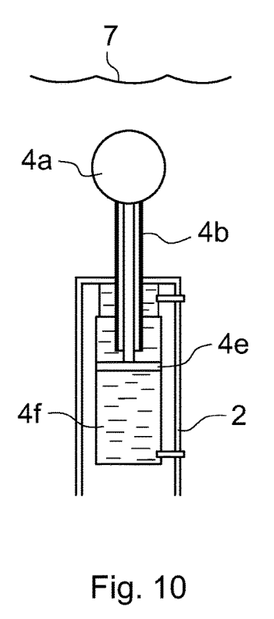
FIG. 10 presents in a side view, in a simplified and diagrammatic way and as a partial section an upper part of the panel element according to one embodiment of the invention where the upper edge of the panel element is kept all the time in a predefined distance below the surface level of the sea.
Figure 11:
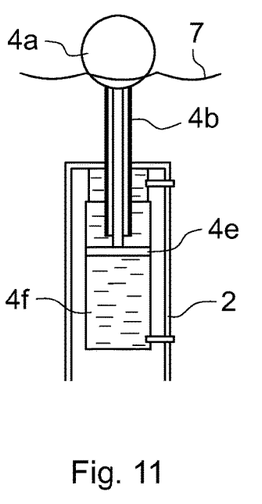
FIG. 11 presents in a side view, in a simplified and diagrammatic way and as a partial section an upper part of the panel element according to another embodiment of the invention where the upper edge of the panel element is kept all the time above the surface level of the sea.
Figure 12:
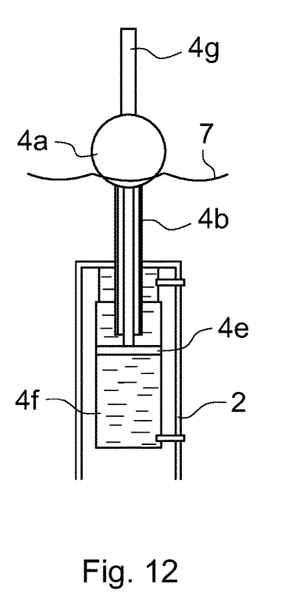
FIG. 12 presents in a side view, in a simplified and diagrammatic way and as a partial section an upper part of the panel element according to still another embodiment of the invention where the upper edge of the panel element with its additional panel portion is kept all the time above the surface level of the sea.
Figure 13:
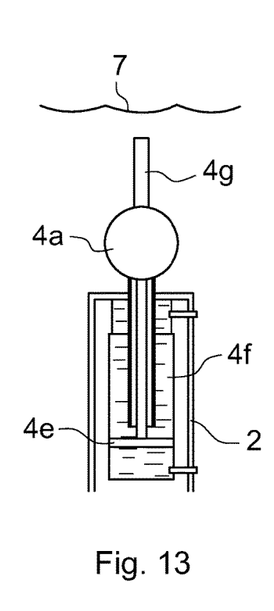
FIG. 13 presents in a side view, in a simplified and diagrammatic way and as a partial section an upper part of the panel element according to FIG. 12 where the upper edge of the panel element with its additional panel portion is kept all the time in a predefined distance below the surface level of the sea.
Figure 14:
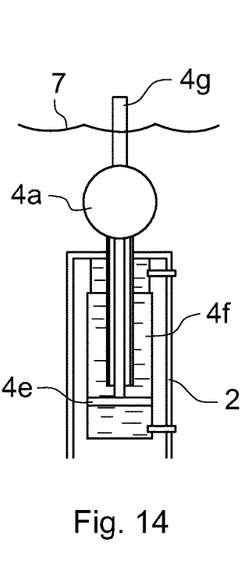
FIG. 14 presents in a side view, in a simplified and diagrammatic way and as a partial section an upper part of the panel element according to FIG. 12 where the upper edge of the panel element with its additional panel portion is kept all the time partially in a predefined distance under the surface level of the sea.

FIGS. 10-14 present in a side view, in a more simplified and diagrammatic way and as a partial section several different embodiments of the invention and several height adjustment positions of the pontoon 4a of the surface level follow-up means 4 according to invention. Each figure presents an embodiment where the distance between the uppermost edge of the entire reciprocating panel element 2 and the surface level 7 has been adjusted to be different. FIG. 10 presents possibly the most advantageous distance solution for the most situations. In this embodiment the upper edge of the pontoon 4a that is the uppermost spot of the structure is all the time beneath the surface level 7 but, however, very close to the surface 7. FIG. 11 presents an embodiment where the pontoon 4a floats more or less on the surface 7 of the water. Now the uppermost spot of the structure can be essentially at maximum as high from the surface 7 as is the diameter of the pontoon 4a. Whereas FIG. 12 presents an embodiment where the pontoon 4a floats more or less on the surface 7 of the water, but now thanks to the additional panel portion 4g above the pontoon 4a, the uppermost spot of the structure is higher than the upper edge of the pontoon 4a. FIGS. 13 and 14 present basically the similar structure as FIG. 12 but now the buoyancy of the pontoon 4a has been adjusted so that the additional panel portion 4g is either totally beneath the surface level 7 or only partially above the surface level 7.

Figure 15:
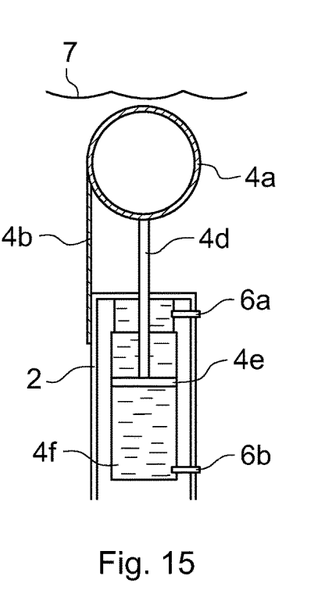
FIG. 15 presents in a side view, in a simplified and diagrammatic way and as a partial section an upper part of the panel element according to one further embodiment of the invention where the upper edge of the panel element is kept all the time in a predefined distance below the surface level of the sea.

FIG. 15 presents in a side view, in a simplified and diagrammatic way and as a partial section an upper part of the panel element 2 according to one further embodiment of the invention where the panel extension 4b comprises only one wall element that is situated at the first side of the panel element 2, and in an advantageous solution the choke valves 6a, 6b are directed towards second side of the panel element 2 so that the panel extension 4b does not collide with the upper choke valve 6a on its lowermost position.

Figures 16, 17:
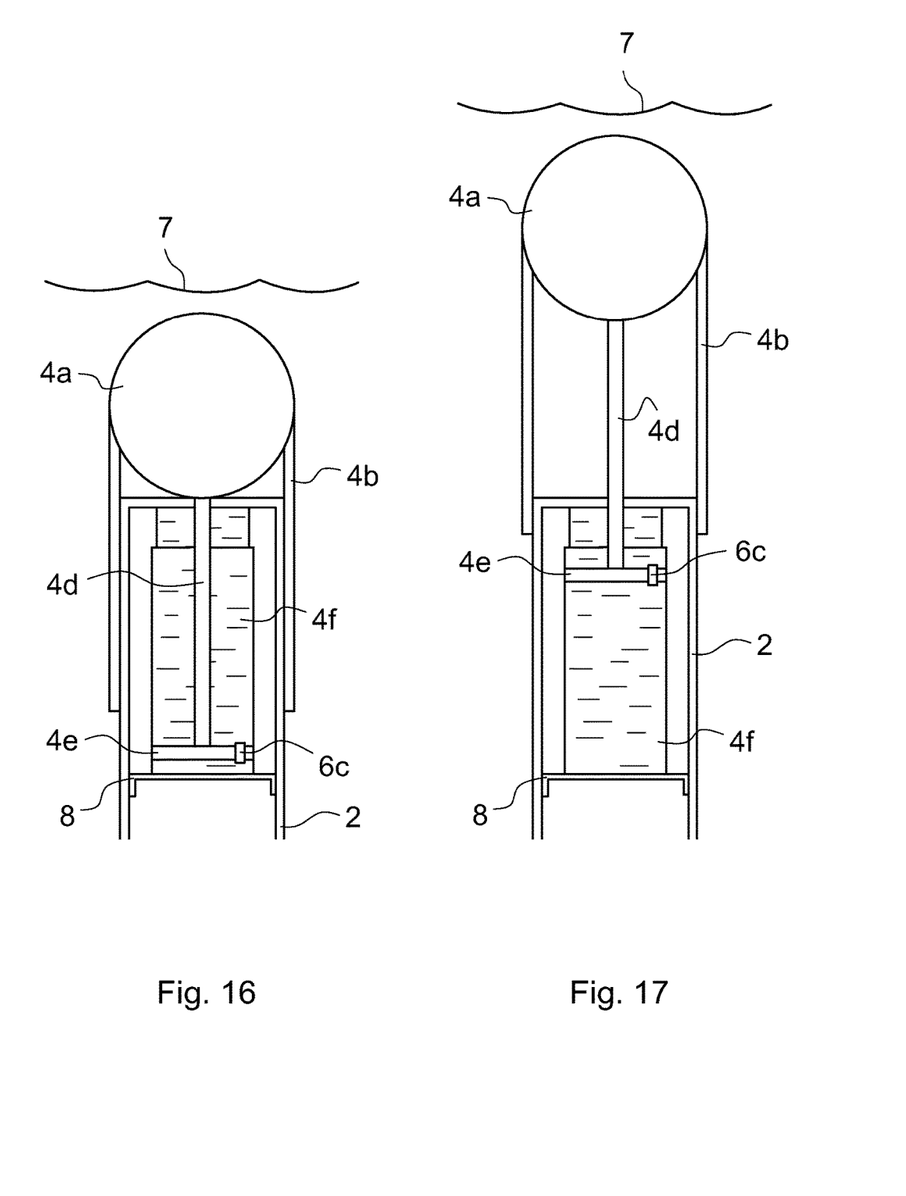
FIG. 16 presents in a side view, in a simplified and diagrammatic way and as a partial section an upper part of the panel element according to a still further embodiment of the invention in its lowermost position.
FIG. 17 presents in a side view, in a simplified and diagrammatic way and as a partial section an upper part of the panel element according FIG. 16 in its uppermost position.

FIGS. 16 and 17 present in a side view, in a simplified and diagrammatic way and as a partial section an upper section of the panel element 2 according to a still further embodiment of the invention. In this embodiment the sidewalls of the panel extension 4b are outside the sidewalls of the panel element 2 that makes it possible to place the hydraulic cylinders 4f just at the upper edge of the lower portion of the panel element 2 without the need to make openings to the sidewalls of the panel extension 4b in order to avoid collision with the hydraulic cylinders 4f when the panel extension 4b comes down to its lowermost position. In this embodiment it is also advantageous to install the choke valve 6c into the piston 4e so that there is no need to make any openings to the sidewall of the panel extension 4b for the choke valve extending through the sidewall of the panel element 2, like for example the choke valve 6a.

The arrangement according to the invention comprises the means for changing the height of the upper edge of the panel element 2 so that the upper edge of the reciprocating panel element 2 follows automatically and self-operated the fluctuation of the surface level 7 of the sea or the water basin caused by the tidal variation. When following the surface level 7 the upper edge of the reciprocating panel element 2 is advantageously just at the surface level 7 or in the neighborhood of the surface level 7 or immediately beneath the surface level 7. In that situation the upper edge of the reciprocating panel element 2 can also be at a pre-determined certain distance beneath the surface level 7, or at a pre-determined certain distance above the surface level 7.

The follow-up of the surface level 7 is based on an attenuated motion where the upper edge of the reciprocating panel element 2 follows the fluctuation of the surface level 7 caused by the tidal movement only, and does not react to the faster motions of waves. The attenuation is achieved by the choke valves 6a, 6b, 6c that are either non-adjustable, adjustable or both in combination together. Adjustable valves are needed if a certain position of the upper edge of the panel element 2 is wanted to keep. For instance, if a stormy weather is coming it may be necessary to keep the upper edge of the panel element 2 as low as possible. Then the surface level follow-up means 4 can be locked for instance at lowermost position by the help of adjustable choke valves a, 6b, 6c by closing the choke valves a, 6b, 6c when the pontoon 4a is its lowermost position. The closing and opening can be done via a remote control (which is illustrated in FIG. 4). In the same way the pontoon 4a can be locked at any wanted position between its normal lowermost and uppermost positions.

It is obvious to the person skilled in the art that the invention is not restricted to the example described above but that it may be varied within the scope of the claims presented below. Thus, for example, the structure of the surface level follow-up means can vary.

The invention claimed is:
1. A wave energy recovery unit having a surface level following arrangement comprising:
   a panel element hinged at its lower edge onto a base provided at a bottom of the sea, the panel element being provided with one or more support structures and one or more support shafts, the panel element receiving a reciprocating motion in response to kinetic energy of waves or tidal currents, and
   a surface level follower changing vertical position of an upper edge of the panel element along with change of the vertical position of a surface level caused by a tidal fluctuation,
   wherein the surface level -follower comprises further one or more supporting members connected to the pontoon, and choke valves to dampen the movement of the pontoon.
2. The wave energy recovery unit according to claim 1, wherein each supporting member comprises a piston rod, a piston and a cylinder filled with liquid, and the piston is arranged to move back and forth in the cylinder aided by the buoyancy of the pontoon.
3. The wave energy recovery unit according to claim 2, wherein upper choke valves are provided at the upper part of the cylinder above the piston, and lower choke valves are provided at the lower part of the cylinder below the piston, and the choke valves are connected from inside the cylinder to the ambient seawater.
4. The wave energy recovery unit according to claim 3, wherein a choke valve is provided in the piston so that the first end of the choke valve is inside the cylinder space above the piston, and the second end of the choke valve is provided inside the cylinder space below the piston so that the choke valve connects upper space of the cylinder with the lower space of the cylinder.
5. The wave energy recovery unit according to claim 1, wherein the choke valves are static apertures that are arranged to operate automatically without adjustment.
6. The wave energy recovery unit according to claim 1, wherein the choke valves are adjustable control valves actuated under control of a control.

7. The wave energy recovery unit according to claim 6, wherein the adjustable control valves are each equipped with a choke to restrict or prevent the water flow through the valves.

8. A wave energy recovery unit having a surface level following arrangement comprising:
   a panel element hinged at its lower edge onto a base provided at a bottom of the sea, the panel element being provided with one or more support structures and one or more support shafts, the panel element receiving a reciprocating motion in response to kinetic energy of waves or tidal currents, and
   a surface level follower slidably mounted as a part of the panel element and changing vertical position of an upper edge of the panel element along with change of the vertical position of a surface level caused by a tidal fluctuation and including,
      a buoyant pontoon forming the upper edge of the panel element arranged to keep its predetermined position in relation to the surface level by the help of buoyancy, and
      one or more supporting members connected to the pontoon, and choke valves to dampen the motions of the pontoon.

9. The wave energy recovery unit according to claim 8, wherein the pontoon is arranged to automatically follow the surface level upwards and downwards at a predetermined distance from the surface level.

10. The wave energy recovery unit according to claim 9, wherein the pontoon is adjusted to follow the surface level upwards and downwards help of buoyancy at a rate of speed that substantially matches a tidal based change in sea level.

11. The wave energy recovery unit according to claim 10, wherein the surface level follower comprises further one or more supporting members connected to the pontoon, and choke valves to dampen the motions of the pontoon.

12. The wave energy recovery unit according to claim 9, wherein the surface level follower comprises further one or more supporting members connected to the pontoon, and choke valves to dampen the motions of the pontoon.

13. A wave energy recovery unit according to claim 8, wherein each supporting member comprises a piston rod, a piston and a cylinder filled with liquid, and each piston is arranged to move back and forth in its associated cylinder by the help of the buoyancy of the pontoon.

14. The wave energy recovery unit according to claim 9, wherein each supporting member comprises a piston rod, a piston and a cylinder filled with liquid, and the piston is arranged to move back and forth in the cylinder by the help of the buoyancy of the pontoon.

* * * * *